United States Patent
Gaal et al.

(10) Patent No.: US 10,536,910 B2
(45) Date of Patent: Jan. 14, 2020

(54) APPARATUS AND METHOD FOR RANDOM ACCESS CHANNEL POWER PRIORITIZATION

(75) Inventors: Peter Gaal, San Diego, CA (US); Juan Montojo, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 13/115,004

(22) Filed: May 24, 2011

(65) Prior Publication Data
US 2012/0127931 A1    May 24, 2012

Related U.S. Application Data

(60) Provisional application No. 61/349,651, filed on May 28, 2010.

(51) Int. Cl.
*H04W 52/04* (2009.01)
*H04W 52/50* (2009.01)

(52) U.S. Cl.
CPC .................................. *H04W 52/50* (2013.01)

(58) Field of Classification Search
CPC .... H04L 1/1861; H04W 52/50; H04W 52/34; H04W 52/281

(Continued)

(56) References Cited

U.S. PATENT DOCUMENTS

2005/0048982 A1* 3/2005 Roland ................. H04W 48/16
                                                          455/449
2005/0249137 A1* 11/2005 Todd ................. H04W 52/0216
                                                          370/311

(Continued)

FOREIGN PATENT DOCUMENTS

CN           1716837 A        1/2006
CN         101296006 A       10/2008

(Continued)

OTHER PUBLICATIONS

"3rd Generation Partnership Project; Technical Specification Group Radio Access Network; Evolved Universal Terrestrial Radio Access (E-UTRA); Physical layer procedures (Release 9)" 3GPP TS 36.213 V9.1.0 (Mar. 2010).

(Continued)

*Primary Examiner* — Jae Y Lee
*Assistant Examiner* — Jean F Voltaire
(74) *Attorney, Agent, or Firm* — Arent Fox, LLP

(57) ABSTRACT

A method, apparatus, and computer program product for wireless communication are provided in which a transmission power is prioritized between an access channel and a second channel. Additionally, the access channel and the second channel are transmitted simultaneously. Each of the access channel and the second channel are transmitted at a transmission power determined based on the priority. Further, a method, apparatus, and computer program product for wireless communication are provided in which information is received regarding first resources to use for transmitting an access channel with an acknowledgment and second resources for transmitting the access channel with a negative acknowledgment. Further, the access channel is transmitted on the first or second resources.

53 Claims, 17 Drawing Sheets

(58) Field of Classification Search
USPC .................................................. 370/328–332
See application file for complete search history.

(56) References Cited

U.S. PATENT DOCUMENTS

| | | | |
|---|---|---|---|
| 2006/0003787 A1 | 1/2006 | Heo et al. | |
| 2009/0109917 A1* | 4/2009 | Pajukoski | H04L 1/0025 370/329 |
| 2009/0203323 A1* | 8/2009 | Ratasuk | H04L 1/1854 455/68 |
| 2010/0027485 A1 | 2/2010 | Noh et al. | |
| 2010/0091708 A1 | 4/2010 | Nishikawa et al. | |
| 2010/0271970 A1* | 10/2010 | Pan | H04L 1/0026 370/252 |
| 2010/0291937 A1* | 11/2010 | Hu | H04L 1/1854 455/450 |
| 2011/0096761 A1* | 4/2011 | Saito | H04B 7/026 370/338 |
| 2011/0268074 A1* | 11/2011 | Li | 370/329 |
| 2012/0008580 A1* | 1/2012 | Lee | H04L 1/1607 370/329 |
| 2012/0057547 A1* | 3/2012 | Lohr | H04L 5/0007 370/329 |
| 2012/0093011 A1* | 4/2012 | Ranta-Aho | H04L 5/0007 370/252 |

FOREIGN PATENT DOCUMENTS

| | | |
|---|---|---|
| CN | 102415187 A | 4/2012 |
| EP | 1605605 A2 | 12/2005 |
| EP | 2129022 A1 | 12/2009 |
| JP | 2006014304 A | 1/2006 |
| JP | 2007267152 A | 10/2007 |
| JP | 2012525030 A | 10/2012 |
| KR | 20060046609 A | 5/2006 |
| KR | 20080031601 A | 4/2008 |
| KR | 20090087788 A | 8/2009 |
| WO | 2005034382 A1 | 4/2005 |
| WO | WO-2008099807 A1 | 8/2008 |
| WO | WO-2010008859 | 1/2010 |
| WO | WO-2010121708 A1 | 10/2010 |

OTHER PUBLICATIONS

International Search Report and Written Opinion—PCT/US2011/038220, International Search Authority—European Patent Office—dated Oct. 14, 2011.

Nokia Siemens Networks: "Summary of offline discussion on UL PC", 3GPP Draft; R1-100815_UL_PC, 3rd Generation Partnership Project (3GPP), Mobile Competence Centre ; 650, Route Des Lucioles F-06921 Sophia-Antipolis Cedex ; France, vol. RAN WG1, no. Valencia, Spain; Jan. 18, 2010, Jan. 22, 2010 (Jan. 22, 2010), XP050418432.

Panasonic: "RACH on SCell for supporting Multiple Timing Advance", 3GPP Draft; R2-112806_RACHEL_PR0CEDURE, 3rd Generation Partnership Project (3GPP), Mobile Competence Centre ; 650, Route Des Lucioles ; F-06921 Sophia-Antipolis Cedex ; France, vol. RAN WG2, no. Barcelona, Spain; May 9, 2011, May 2, 2011 (May 2, 2011), XP050495107.

Qualcomm Incorporated: "Non SC-FDM Transmission in UL of LTE-A", 3GPP Draft; RI-101482 Non SC-FDM TXMN, Generation Partnership Project (3GPP), Mobile Competence Centre ; 650, Route Des Lucioles ; F-06921 Sophia-Antipolis Cedex ; France, vol. RAN WG1, no. San Francisco, USA; Feb. 22, 2010, Feb. 16, 2010 (Feb. 16, 2010), XP050418936.

Qualcomm Incorporated: "Non SC-FDM Transmission in UL of LTE-A", 3GPP Draft; RI-102328 Non SC-FDM TXMN, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 6, 2010 (Apr. 6, 2010), XP050419560.

Qualcomm Incorporated: "UCI Transmission for CA", 3GPP Draft; RI-102746 UCI Transmission for CA, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; May 10, 2010, May 4, 2010 (May 4, 2010), XP050419940.

Alcatel-Lucent et al., "Way Forward on UL Power Control with Carrier Aggregation," 3GPP TSG RAN WG1 #60bis, R1-102563, Apr. 2010.

* cited by examiner

| Index | Channel Combination | Rel-10 | | Rel-11 | |
|---|---|---|---|---|---|
| | | Type-A E-UTRAN | Type-B E-UTRAN | Type-A E-UTRAN | Type-B E-UTRAN |
| 1 | PRACH for timing on SCC with any other Tx on PCC | No | No | Yes | Yes |
| 2 | PRACH for SR on SCC with any other Tx on PCC | N/A | No | N/A | No |
| 3 | PRACH for timing on PCC with PUCCH on SCC | No | No | No | No |
| 4 | PRACH for SR on PCC with PUCCH on SCC | N/A | No | N/A | No |
| 5 | PRACH for timing on PCC with PUSCH on SCC | No | No | Yes | Yes |
| 6 | PRACH for SR on PCC with PUSCH on SCC | N/A | No | N/A | No |
| 7 | PRACH for timing on PCC with SRS on SCC | No | Yes | No | No |
| 8 | PRACH for SR on PCC with SRS on SCC | N/A | No | N/A | Yes |
| 9 | PRACH for timing on PCC with PUCCH (or PUSCH with UCI) on PCC | No | No | No | No |
| 10 | PRACH for SR on PCC with PUCCH (or PUSCH with UCI) on PCC | N/A | Yes | N/A | Yes |
| 11 | PRACH for timing on PCC with PUSCH on PCC | No | No | No | No |
| 12 | PRACH for SR on PCC with PUSCH on PCC | N/A | No | N/A | No |
| 13 | PRACH for timing on PCC with SRS on PCC | No | No | No | No |
| 14 | PRACH for SR on PCC with SRS on PCC | N/A | Yes | N/A | Yes |

| Index | Channel Combination | PRACH priority relative to other channel when combination is allowed | Note |
|---|---|---|---|
| 1 | PRACH for timing on SCC with any other Tx on PCC | Lower | Only for Rel-11+ |
| 2 | PRACH for SR on SCC with any other Tx on PCC | N/A | |
| 3 | PRACH for timing on PCC with PUCCH on SCC | N/A | |
| 4 | PRACH for SR on PCC with PUCCH on SCC | N/A | |
| 5 | PRACH for timing on PCC with PUSCH on SCC | Higher | Only for Rel-11+ |
| 6 | PRACH for SR on PCC with PUSCH on SCC | N/A | |
| 7 | PRACH for timing on PCC with SRS on SCC | N/A | |
| 8 | PRACH for SR on PCC with SRS on SCC | Higher | Only for Type-B E-UTRAN |
| 9 | PRACH for timing on PCC with PUCCH on PCC | N/A | |
| 10 | PRACH for SR on PCC with PUCCH on PCC | Higher or Configurable | Only for Type-B E-UTRAN |
| 11 | PRACH for timing on PCC with PUSCH on PCC | N/A | |
| 12 | PRACH for SR on PCC with PUSCH on PCC | N/A | |
| 13 | PRACH for timing on PCC with SRS on PCC | N/A | |
| 14 | PRACH for SR on PCC with SRS on PCC | Higher | Only for Type-B E-UTRAN |

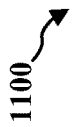

FIG. 11

APPARATUS AND METHOD FOR RANDOM ACCESS CHANNEL POWER PRIORITIZATION

CROSS-REFERENCE TO RELATED APPLICATION(S)

This application claims the benefit of U.S. Provisional Application Ser. No. 61/349,651, entitled "Apparatus and Method for PRACH Power Prioritization" and filed on May 28, 2010, which is expressly incorporated by reference herein in its entirety.

BACKGROUND

Field

The present disclosure relates generally to communication systems, and more particularly, to a physical random access channel (PRACH) power prioritization.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Additionally, these improvements should be applicable to other multi-access technologies and the telecommunication standards that employ these technologies.

SUMMARY

In an aspect of the disclosure, a method, computer program product, and apparatus are provided in which a transmission power is prioritized between an access channel and a second channel. Additionally, the access channel and the second channel are transmitted simultaneously. Each of the access channel and the second channel are transmitted at a transmission power determined based on the priority.

In an aspect of the disclosure, a method, computer program product, and apparatus are provided in which information is received regarding first resources to use for transmitting an access channel with an acknowledgment and second resources for transmitting the access channel with a negative acknowledgment. In addition, the access channel is transmitted on one of the first resources and the second resources.

BRIEF DESCRIPTION OF THE DRAWINGS

FIG. 10 is a diagram for illustrating whether a random access channel may be transmitted with another channel simultaneously.

FIG. 11 is a diagram for illustrating priority rules pursuant to a second exemplary configuration.

DETAILED DESCRIPTION

Figure 1:
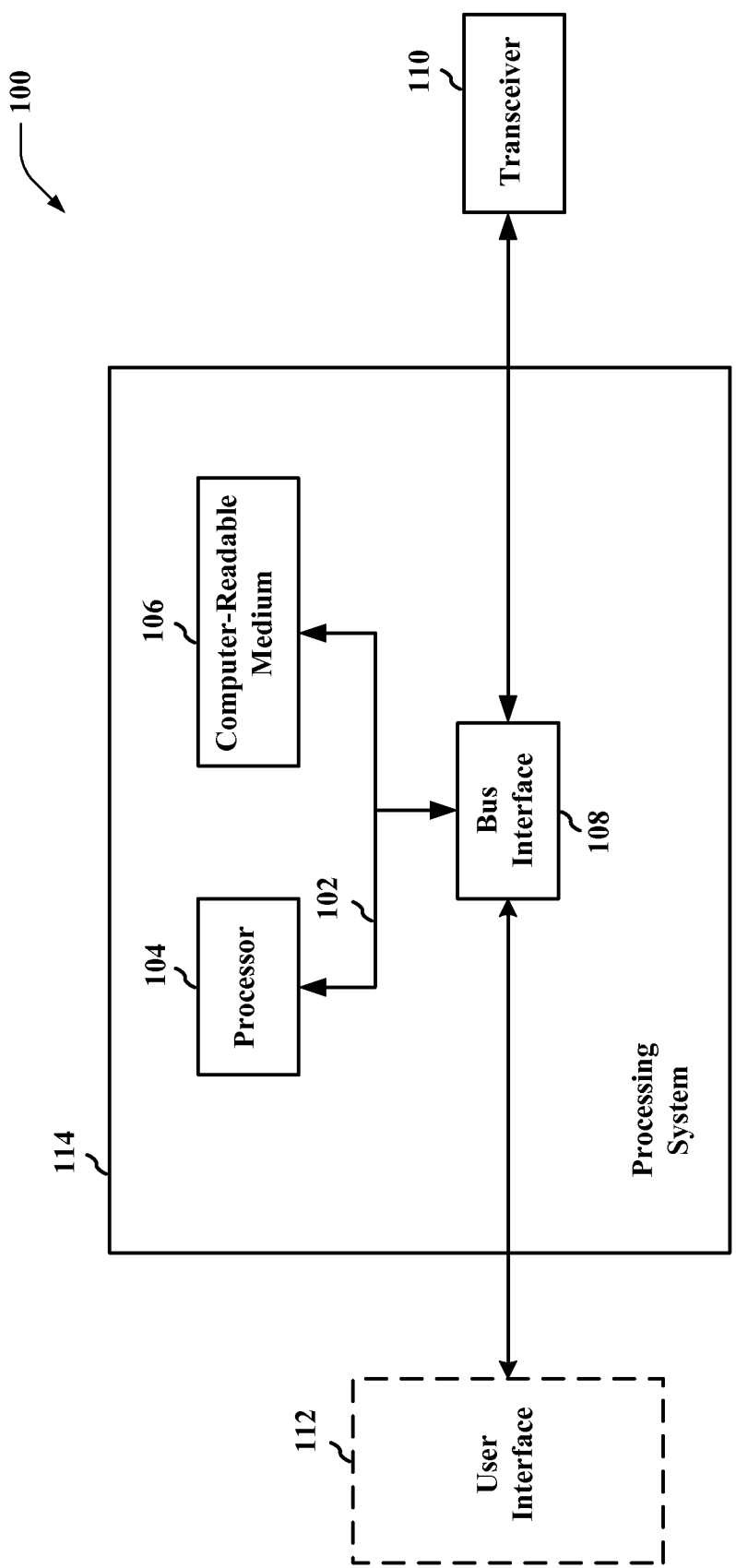
FIG. 1 is a diagram illustrating a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium.

The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
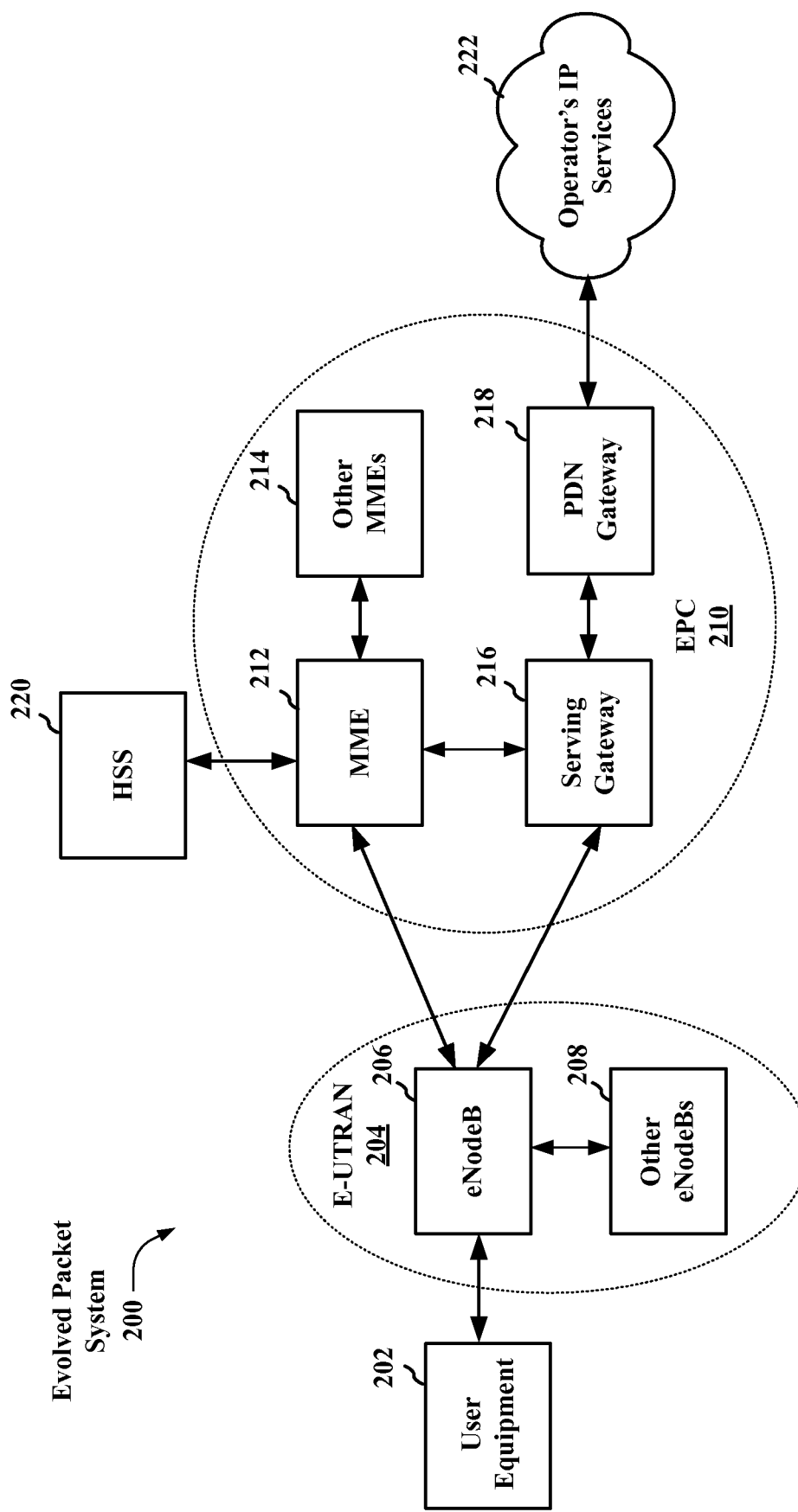
FIG. 2 is a diagram illustrating a network architecture.

FIG. 2 is a diagram illustrating an LTE network architecture 200 employing various apparatuses 100 (FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS 200 can interconnect with other access networks, but for simplicity those entities/interfaces are not shown. As shown, the EPS 200 provides packet-switched services, however, as those skilled in the art will readily appreciate, the various concepts presented throughout this disclosure may be extended to networks providing circuit-switched services.

The E-UTRAN includes an evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), an access point or some other suitable terminology. The eNB 206 provides an access point to the EPC 210 for a UE 202. Examples of UEs 202 include a cellular phone, a smart phone, a session initiation protocol (SIP) phone, a laptop, a tablet, a personal digital assistant (PDA), a satellite radio, a global positioning system, a multimedia device, a video device, a digital audio player (e.g., MP3 player), a camera, a game console or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem, and a PS Streaming Service.

Figure 3:
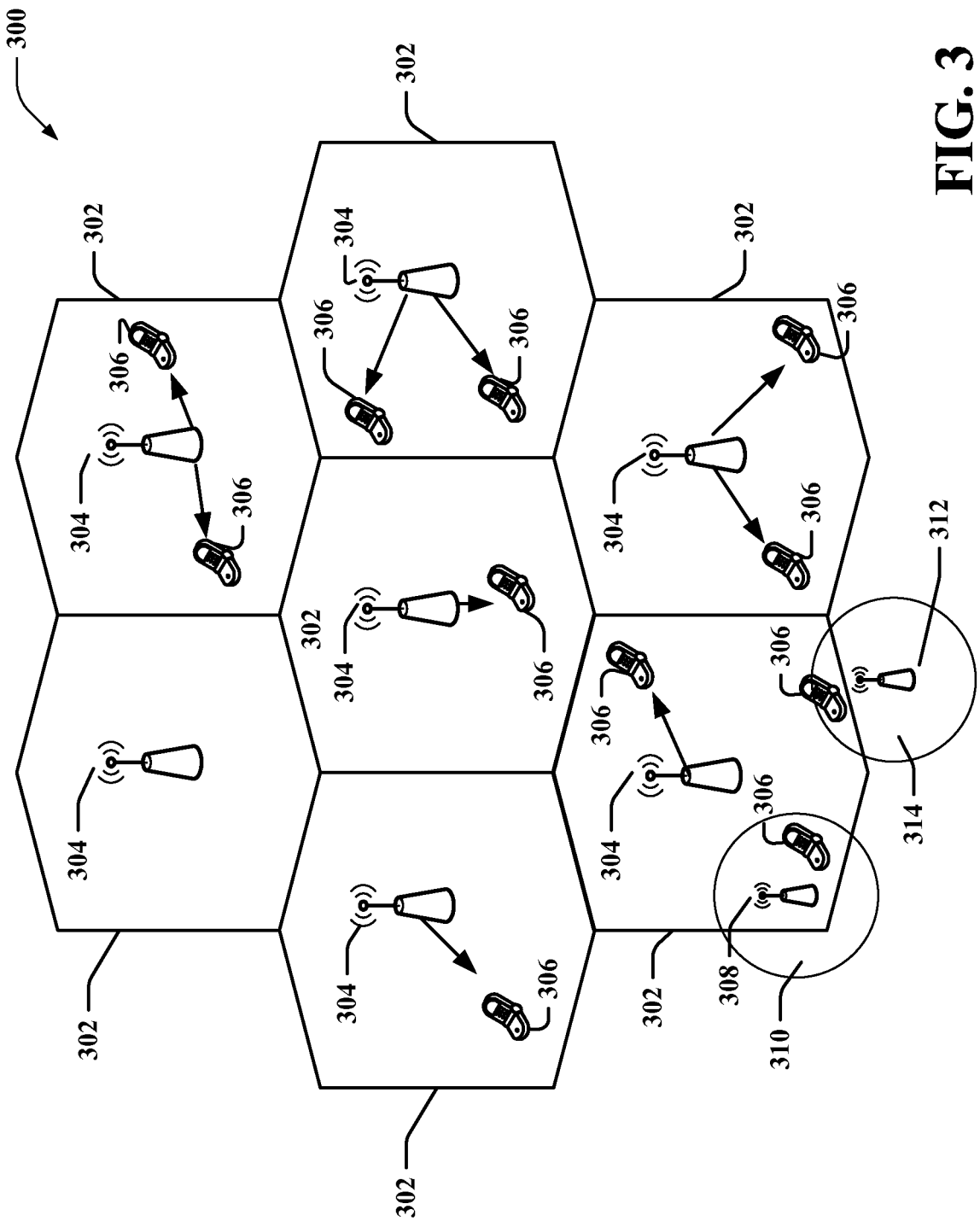
FIG. 3 is a diagram illustrating an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR). Although the uplink may use SC-FDMA, which is different from OFDMA, the symbols used in the uplink may be referred to as OFDM symbols or SC-FDM symbols, interchangeably.

Figure 4:
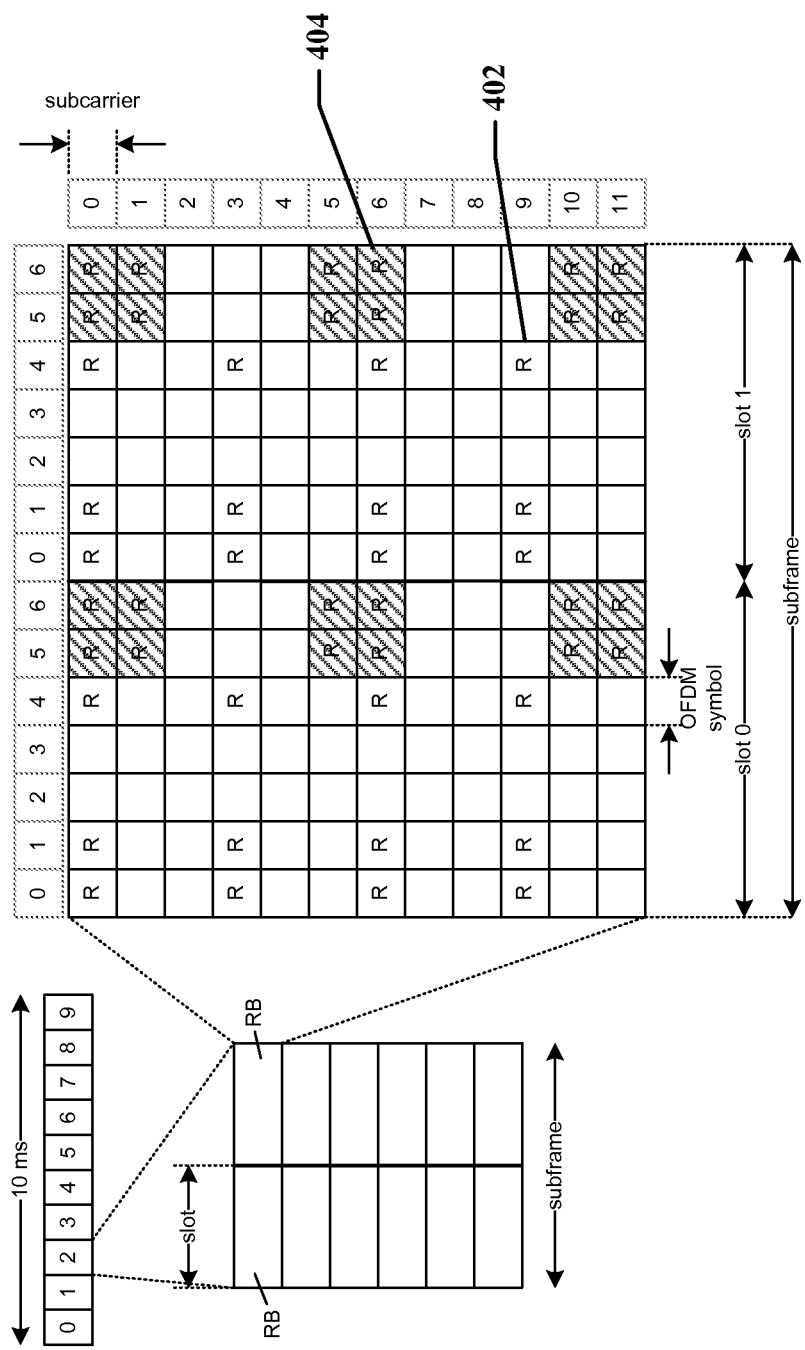
FIG. 4 is a diagram illustrating a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
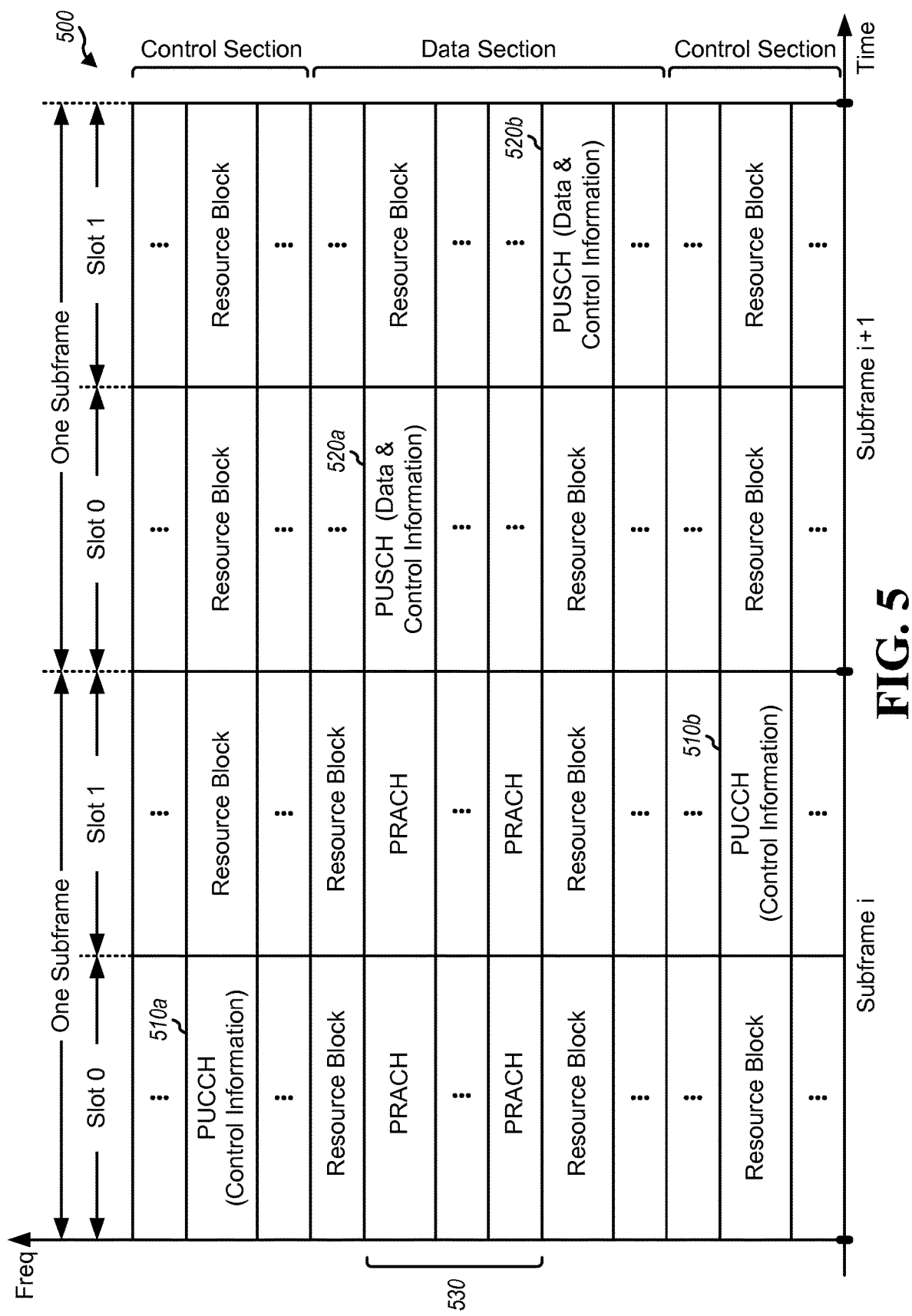
FIG. 5 shows an exemplary format for the uplink in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms)

or in a sequence of few contiguous subframes and a UE can make only a single PRACH attempt per frame (10 ms).

Figure 6:
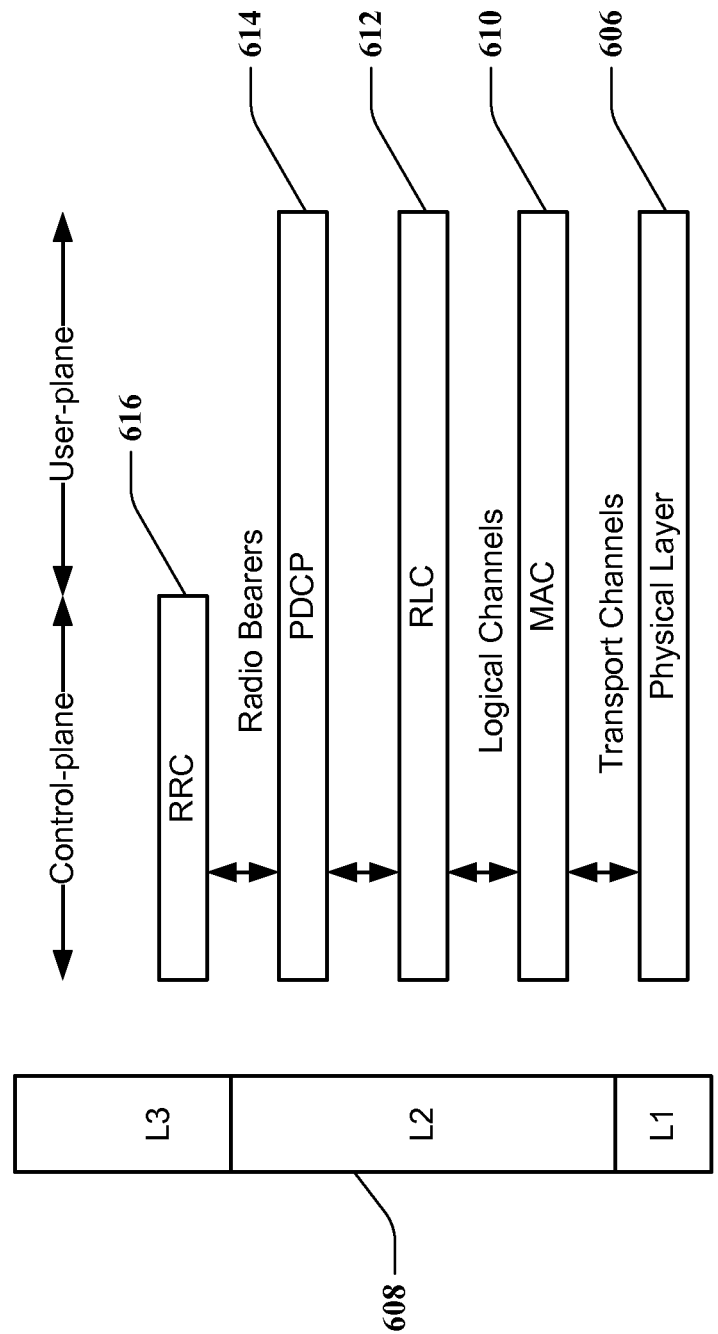
FIG. 6 is a diagram illustrating a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
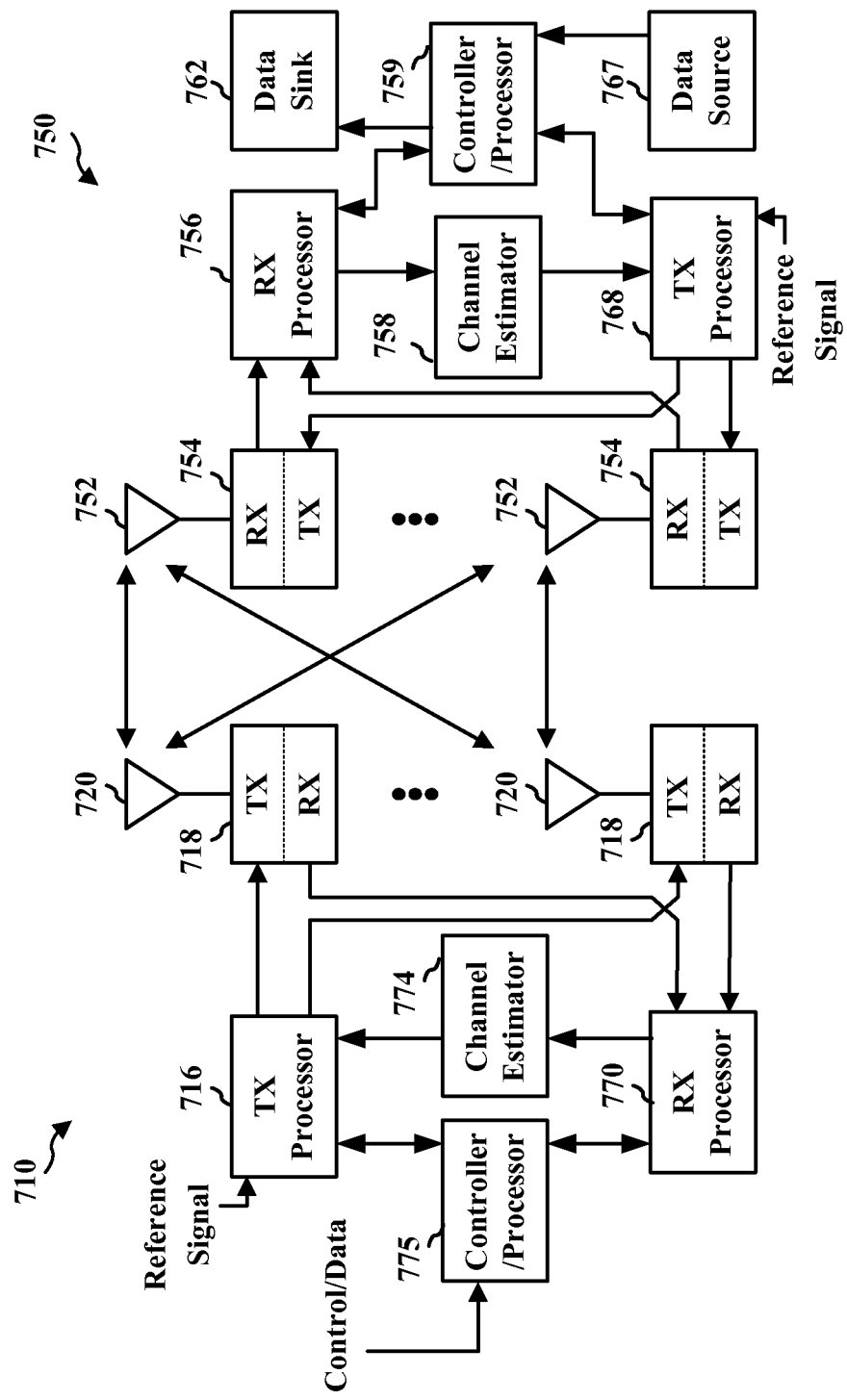
FIG. 7 is a diagram illustrating an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations. The processing system 114 described in relation to FIG. 1 includes the UE 750. In particular, the processing system 114 includes the TX processor 768, the RX processor 756, and the controller/processor 759.

In multi-carrier systems, an UL power control methodology that jointly controls UE transmit power across multiple carriers is needed to resolve conflicts in power limited scenarios where the sum power across multiple carriers would result in a total power that exceeds what is allowed for the UE. The total power allowed may be limited by a fixed absolute maximum value or by a lower value depending on the current transmission configuration in order to comply with emission limits. In most cases, when power limitation does not occur, per carrier individual power control suffices. In power limited scenarios, the total power may need to be reduced, compared to what the power control rules would otherwise apply, by reducing the power of one or more physical UL channels. Reducing the power may be by a power scaling or by dropping particular physical channels. For example, when PUSCH or PUCCH is transmitted in the same subframe on one or more carriers, the PUCCH power may be prioritized by allocating a requisite power to PUCCH and then allocating a remaining power, if any, to PUSCH. In LTE, a new communication scheme and/or power prioritization scheme are needed when the PRACH is to be transmitted together with other channels on the same or other carriers.

In LTE Rel-8, a UE may transmit PRACH for initial access when in an idle mode. A UE may also transmit PRACH to establish time adjustment when in a connected mode after time adjustment timer expiry. As LTE UL is synchronous, an eNB sends time adjustment commands to maintain received signal synchronization on the UL. If a UE has not received time adjustment commands for longer than a certain pre-defined time period (e.g., 500 ms), the UE is required to send PRACH first in order to reestablish timing when the UE intends to transmit. A UE may use the PRACH, for example, when the eNB indicates DL data arrival after an idle period in connected mode. A UE may also transmit PRACH to establish time adjustment and to initialize power control after a handover. In E-UTRAN where processing of a scheduling request (SR) is not supported, a UE transmits PRACH whenever the UE intends to initiate a data transmission on the UL. In the following discussion, a E-UTRAN that supports SR is called a Type-A E-UTRAN and a E-UTRAN that does not support SR is called a Type-B E-UTRAN.

In LTE Rel-8, in which no multicarrier operation is defined, there is no need for a PRACH prioritization rule in a Type-A E-UTRAN because the PRACH is not transmitted simultaneously with any other channel. In LTE Rel-8, in a Type-B E-UTRAN, collision of PRACH and PUCCH transmission may occur, for example, when the UE is required to acknowledge a DL transmission with ACK/NAK on the UL in a subframe in which a PRACH signal should also be sent to indicate an UL SR. Because the PRACH plays the role of the SR in a Type-B E-UTRAN, similar prioritization rules as for the SR should apply. However, for the SR, there is an option of sending ACK/NAK and SR simultaneously with position encoding but this option does not apply to the PRACH transmission because ACK/NAK cannot be encoded in the PRACH.

Figure 8:
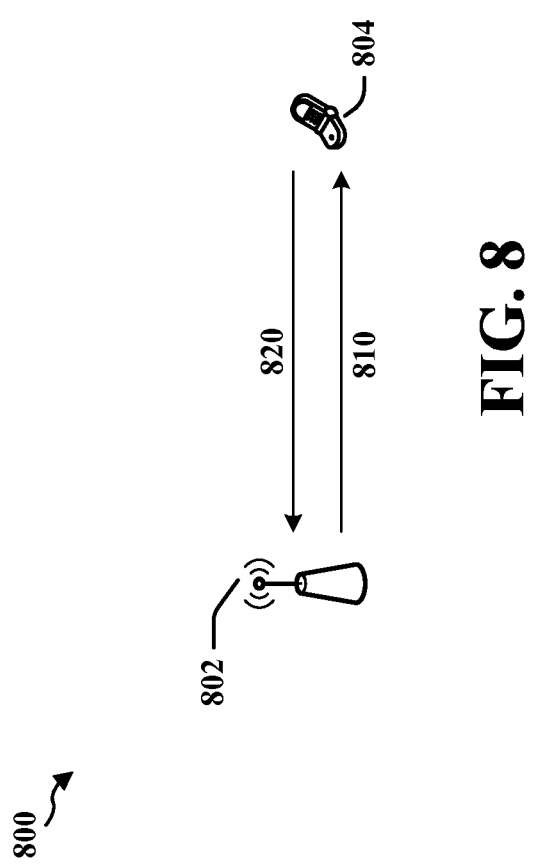
FIG. 8 is a diagram for illustrating a first exemplary configuration.
Figure 9:
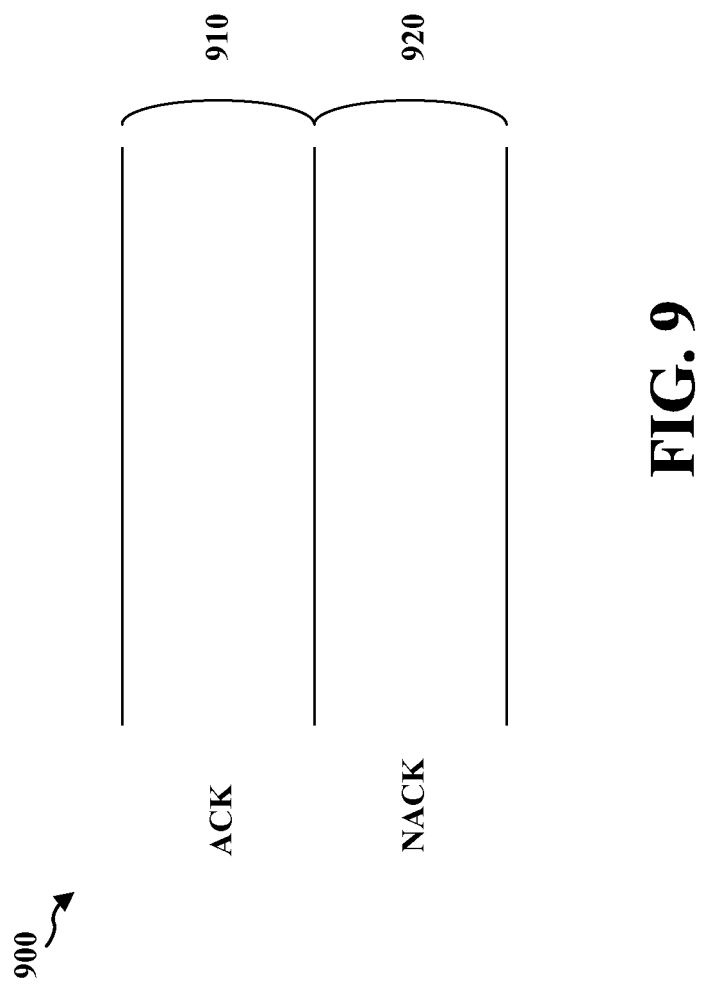
FIG. 9 is a second diagram for illustrating the first exemplary configuration.

FIG. 8 is a diagram 800 for illustrating a first exemplary configuration. FIG. 9 is a second diagram 900 for illustrating the first exemplary configuration. The UE 804 receives from the serving eNB 802 information 810 regarding first resources 910 to use for transmitting an access channel with an ACK and second resources 920 for transmitting the access channel with a NACK. The UE 804 transmits the access channel 820 on one of the first resources 910 or the second resources 920 in order to indicate an ACK or a NACK, respectively. In one configuration, the access channel is a random access channel. In another configuration, the random access channel is a PRACH.

As such, to solve the issues related to simultaneous transmission of the PRACH and the ACK/NACK, the E-UTRAN can partition available PRACH resource indices into sets 910 and 920 to indicate an ACK and a NACK, respectively. A UE may then communicate an ACK with a PRACH transmission by transmitting the PRACH in the resources 910 and communicate a NACK with a PRACH transmission by transmitting the PRACH in the resources 920. In another configuration, a UE may communicate an ACK or a NACK with a PRACH transmission by changing the format of the PRACH and/or by using a particular cyclic shift with the PRACH transmission.

FIG. 10 is a diagram 1000 for illustrating whether a PRACH may be transmitted with another channel simultaneously. In LTE Rel-10, a single carrier waveform need not be maintained and therefore PRACH could be transmitted simultaneously with other physical channels even on the same component carrier. Furthermore, in LTE Rel-10, multicarrier operation is allowed. As such, because the PRACH may be transmitted simultaneously with other channels, PRACH power control and prioritization is needed. The use cases for PRACH in LTE Rel-10 are similar to LTE Rel-8. First, a UE may transmit PRACH for initial access when in an idle mode. Because initial access is performed in single carrier mode, this use case is unchanged compared to LTE Rel-8. Second, a UE may transmit PRACH to establish a time adjustment when in a connected mode after time adjustment timer expiry. In LTE Rel-10, only a common time adjustment across carriers is supported, so this aspect will not require changes relative to LTE Rel-8. Third, a UE may transmit PRACH to establish time adjustment and to initialize power control after a handover. The handover procedure should establish initial power setting and timing based on a single carrier, so LTE Rel-8 rules should apply. Fourth, in a Type-B E-UTRAN, PRACH is used as an SR indication. The SR needs to be sent only on a single carrier, so the solution should be similar to LTE Rel-8 in the sense that transmission of multiple PRACH at the same time would not be necessary. In addition, there is no reason to send separate PRACH for timing re-establishment and PRACH for SR at the same time. The Rel-10+(i.e., Rel-10 and beyond) scenarios are summarized in FIG. 10 in which the multiple carriers include one primary component carrier (PCC) and at least one secondary component carrier (SCC). In the figure, for LTE Rel-10 and LTE Rel-11+ and Type-A E-UTRAN and Type-B E-UTRAN, as defined supra, "No" indicates that the channel combination does not occur, "Yes" indicates the that channel combination occurs, and "N/A" indicates the channel combination is not applicable. A PCC is a component carrier on which a PUCCH transmitted on the component carrier corresponds to at least one of a PUSCH transmitted on the component carrier or a PUSCH transmitted on an SCC. An SCC is a component carrier on which a PUSCH transmitted on the component carrier corresponds to a PUCCH transmitted on the PCC.

FIG. 11 is a diagram 1100 for illustrating priority rules pursuant to a second exemplary configuration. According to the second exemplary configuration, a UE prioritizes a transmission power between an access channel and a second channel. The UE transmits the access channel and the second channel simultaneously and each of the access channel and the second channel are transmitted at a transmission power determined based on the priority. The access channel may be a random access channel, and specifically, a PRACH. The access channel and the second channel are prioritized in channel combinations indexes 1, 5, 8, 10, and 14 in which a "Yes" is shown in FIG. 10. In one configuration, the prioritization is as shown in FIG. 11: for channel combination 1, a PRACH that carries timing information on an SCC has a lower priority than any other transmission on the PCC; for channel combination 5, a PRACH that carries timing information on the PCC has a higher priority than a PUSCH transmission on an SCC; for channel combination 8, a PRACH that indicates an UL SR on the PCC has a higher priority than sounding reference signals (SRS) transmitted on an SCC; for channel combination 10, a PRACH that indicates an UL SR on the PCC has a higher priority or is configurable to have a higher or a lower priority than a PUCCH (or PUSCH with UCI) transmitted on the PCC; and/or for channel combination 14, a PRACH that indicates an UL SR on the PCC has a higher priority than SRS transmitted on the PCC.

The aforementioned physical channel prioritization does not necessarily require dropping one or more of the colliding channel transmissions, but rather prioritizing their power. Through power prioritization, the channel with a higher priority is allocated the necessary or requisite power first and then any leftover or remaining power is allocated to the lower priority channel. The same process may be applied successively if there are more than two simultaneous channel transmissions. Channels of equal priority may be scaled with the same factor or other rules may be applied. For example, power distribution among equal priority channels in power limited scenarios can be UE implementation dependent.

Combinations of more than two physical channel combinations can occur. For these, as far as PRACH transmission is concerned, the same priority rules as for two channels can be applied, as long as care is taken so that 'priority loops' are avoided. For example, a priority loop should be avoided in which priority of the PRACH is greater than the priority of channel X, the priority of the PRACH is less than the priority of channel Y, but that the priority of channel X is greater than the priority of channel Y.

Figure 12:
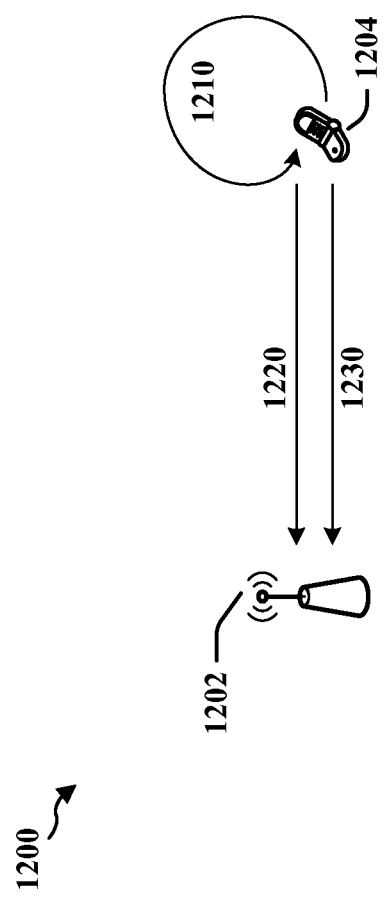
FIG. 12 is a diagram for illustrating the second exemplary configuration.

FIG. 12 is a diagram 1200 for illustrating the second exemplary configuration. As shown in FIG. 12, the UE 1204 prioritizes (1210) a transmission power between an access channel 1220 and a second channel 1230. The UE 1204 transmits the access channel 1220 and the second channel 1230 simultaneously to the eNB 1202. Each of the access channel 1220 and the second channel 1230 are transmitted at a transmission power determined based on the priority. The UE 1204 allocates a requisite transmission power to the channel with a higher priority and allocates a remaining transmission power to the channel with a lower priority. As discussed supra, the access channel may be a random access channel, and more specifically, a PRACH.

Normally, within a single carrier, such as in LTE Rel-8, the E-UTRAN assigns non-overlapping resources for PRACH and SRS. In a multi-carrier setup, this is not necessary, as the different carriers are already orthogonal. This, however, does not hold entirely for power limited scenarios. For power limited scenarios, SRS and PRACH could be prioritized, for example, as shown in FIG. 11. Alternatively, the SRS may power 'puncture' the PRACH power. As such, because the SRS is transmitted in a single OFDM symbol, the power of the transmission of the PRACH (which may have a higher priority than the SRS) may be reduced or the transmission of the PRACH dropped in one symbol only during the PRACH transmission. Such an operation could be specified, or such operation could be explicitly allowed/disallowed by semi-static RRC signaling. Note that in many cases, SRS transmission may fall in the guard-period of the PRACH transmission, and therefore there would be no collision from the UE transmit power perspective.

Certain PRACH formats involve transmission across more than one consecutive subframe. The PRACH transmission power may be kept equal in the subframes in this case to enable correct PRACH detection by the eNB. Since the other physical channel allocations may be different in the consecutive PRACH subframes, or their power may be different, maintaining the PRACH power at the same power through multiple subframes could result in conflicts in certain power limited scenarios. Whenever PRACH is a higher priority than all other channels involved, there is no conflict, as the PRACH power would be allocated first in any case. A problem may arise when the PRACH is a lower priority channel in at least one of the PRACH subframes. Channel combinations 1 and 10, as shown in FIG. 11, allow for the PRACH to have a lower priority.

With respect to channel combination 1 in which a PRACH that carries timing information on an SCC has a lower priority than any other transmission on the PCC, a UE may pre-calculate a power cap in each of the PRACH subframes before initiating the PRACH transmission and apply the lowest power cap in all PRACH subframes. Such a scheme avoids a PRACH power variation. However, the scheme requires the UE to decode certain DL control information earlier in order to enable pre-calculating the necessary power. Pre-calculating can be burdensome on the UE. Further, channel combination 1 can be avoided by appropriate network signaling and therefore an optimum solution may not be necessary. In another configuration, which does not require modifying the UE processing timeline, a UE may apply an individual power cap in each of the subframes (therefore the PRACH power may vary across the subframes), and in subsequent subframes, the UE may apply the lesser of the current power cap or the power cap in the preceding subframe. Typically, the PRACH power would vary in only a fraction of the cases.

With respect to channel combination 10 in which a PRACH that indicates an UL SR on the PCC has a lower priority than a PUCCH transmitted on the PCC (this occurs only if the PRACH priority is configurable and the configuration is set such that PRACH has the lower priority), appropriate network signaling cannot always avoid the particular channel combination, as avoiding all collisions of PRACH and HARQ feedback on the UL would be too burdensome. One solution is to disallow configuring PRACH with a lower priority whenever the multi-subframe PRACH format is used. As such, in the one solution, the PRACH is configured with a lower priority only when the single-subframe PRACH format is used. Alternatively, the same solutions as discussed supra with regard to the channel combination 1 can be applied.

Referring again to FIG. 12, the second exemplary method may also be applied to LTE Rel-8 when PRACH is to be transmitted with one or more additional channels. In one configuration, when PRACH and ACK/NAK are to be transmitted simultaneously, one of the PRACH transmission or the ACK/NACK transmission may be dropped by reducing the transmission power to zero. In another configuration, configurable prioritization may be allowed, which could be accomplished by including a new 1-bit information element (IE) in the RRC parameters. Setting the bit to '0' or '1' would switch between PRACH priority and ACK/NAK priority. Including such information would only be necessary when SR resources are not allocated to the UE, i.e., the UE is operating in a Type-B E-UTRAN.

Figure 13:
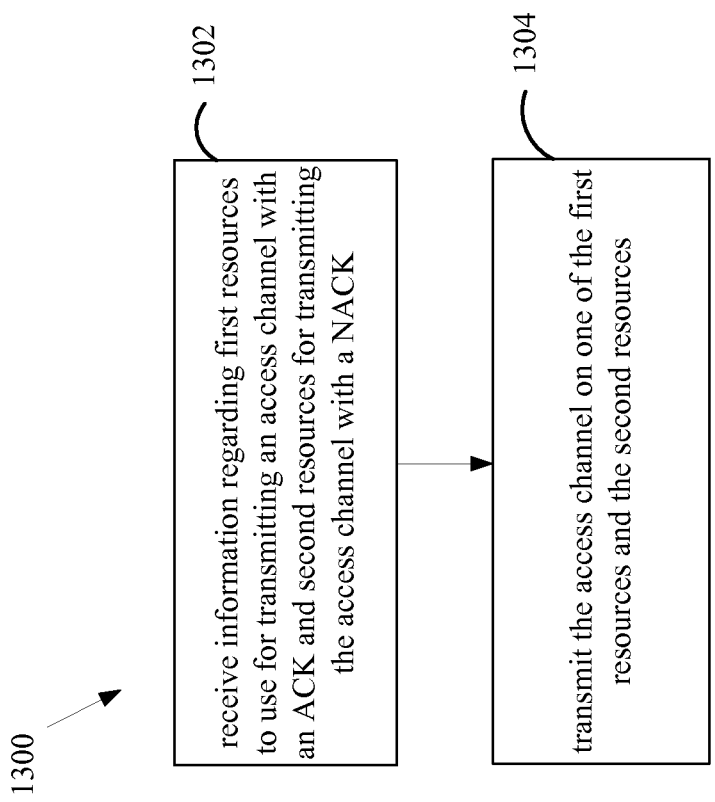
FIG. 13 is a flow chart of a first method of wireless communication.

FIG. 13 is a flow chart 1300 of a first method of wireless communication. According to the method, a UE receives information regarding first resources to use for transmitting an access channel with an ACK and second resources for transmitting the access channel with a NACK (1302). The UE transmits the access channel on one of the first resources and the second resources (1304). The UE transmits the access channel in the first resources in order to indicate an ACK and transmits the access channel in the second resources in order to indicate a NACK. The access channel may be a random access channel, and more specifically, a PRACH. Optionally, the UE may receive information regarding other resources to use for transmitting an access channel without ACK and NACK.

Figure 14:
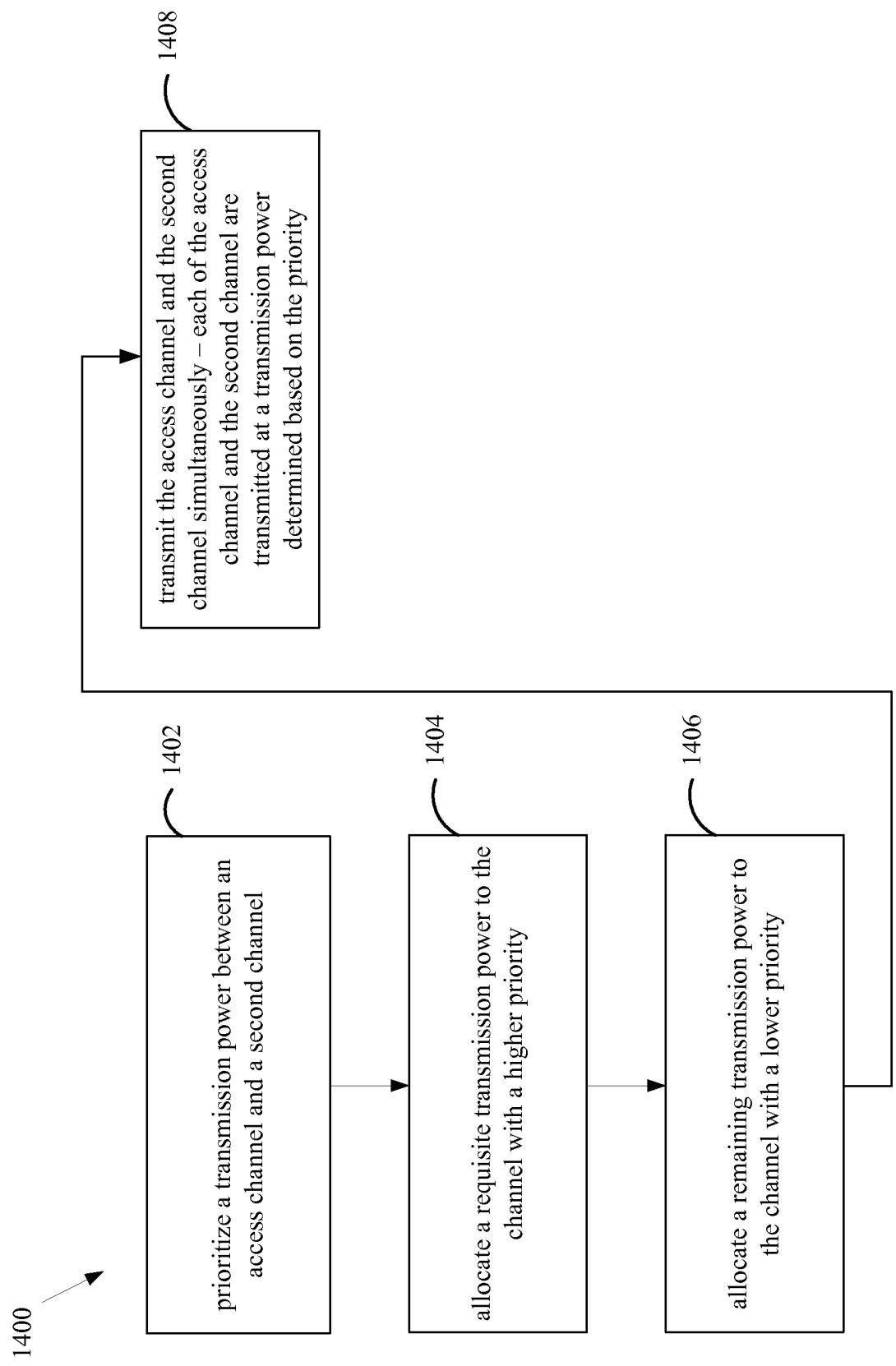
FIG. 14 is a flow chart of a second method of wireless communication.

FIG. 14 is a flow chart 1400 of a second method of wireless communication. As shown in FIG. 14, a UE prioritizes a transmission power between an access channel and a second channel (1402). The UE allocates a requisite transmission power to the channel with a higher priority (1404) and allocates a remaining transmission power to the channel with a lower priority (1406). The remaining transmission power may be the lesser of the remaining transmission power left after the allocation of a requisite transmission power to the channel with a higher priority (1404) or the power required for the channel with a lower priority (1406) in the absence of power limitation. In addition, the UE transmits the access channel and the second channel simultaneously (1408). Each of the access channel and the second channel are transmitted at a transmission power determined based on the priority (1408). The access channel may be a random access channel, and more specifically, a PRACH.

The PRACH and the second channel may be transmitted on at least one component carrier of a plurality of component carriers.

In one configuration, the plurality of component carriers includes a PCC and at least one SCC, and the UE prioritizes the transmission power between the PRACH and the second channel by assigning the PRACH a first priority and the second channel a second priority when the PRACH carries timing information on the PCC and the second channel is a PUSCH transmitted on an SCC of the at least one SCC. In another configuration, the first priority is greater than the second priority as shown in channel combination 5 of FIG. 11.

In one configuration, the plurality of component carriers includes a PCC and at least one SCC, and the UE prioritizes the transmission power between the PRACH and the second channel by assigning the PRACH a first priority and the second channel a second priority when the PRACH indicates an UL SR on the PCC and the second channel carries SRS on the PCC or an SCC of the at least one SCC. In another configuration, the first priority is greater than the second priority as shown in channel combinations 8, 14 of FIG. 11).

In one configuration, the plurality of component carriers includes a PCC and at least one SCC, and the UE prioritizes the transmission power between the PRACH and the second channel by assigning the PRACH a first priority and the second channel a second priority when the PRACH indicates an UL SR on the PCC and the second channel is a PUCCH transmitted on the PCC. In another configuration, the first priority is greater than the second priority as shown in channel combination 10 of FIG. 11.

In one configuration, the plurality of component carriers includes a PCC and at least one SCC, and the UE prioritizes the transmission power between the PRACH and the second channel by assigning the PRACH a first priority and the second channel a second priority when the PRACH carries timing information on an SCC of the at least one SCC and the second channel is transmitted on the PCC. In another configuration, the first priority is less than the second priority as shown in channel combination 1 of FIG. 11.

In one configuration, the plurality of component carriers includes a PCC and at least one SCC, and the UE prioritizes the transmission power between the PRACH and the second channel by assigning the PRACH a first priority and the second channel a second priority when the PRACH indicates an UL SR on the PCC and the second channel is a PUCCH transmitted on the PCC. In another configuration, the first priority is less than the second priority as shown in channel combination 10 of FIG. 11 when the priority is configurable and the priority of PRACH is configured to be lower than the priority of the second channel.

Figure 15:
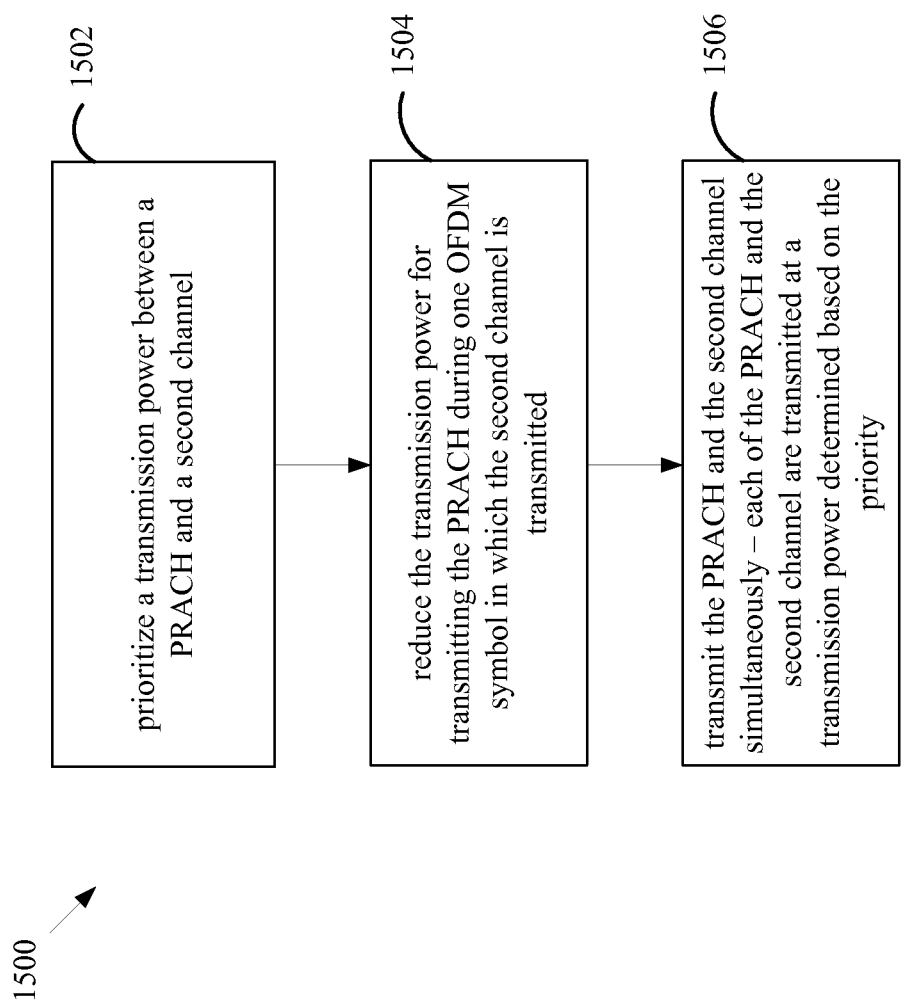
FIG. 15 is another flow chart in accordance with the second method of wireless communication.

FIG. 15 is another flow chart 1500 in accordance with the second method of wireless communication. As shown in FIG. 15, a UE prioritizes a transmission power between a PRACH and a second channel (1502). For channel combinations 8, 14, the UE reduces the transmission power for transmitting the PRACH during one OFDM symbol in which the second channel is transmitted (1504). The UE transmits the PRACH and the second channel simultaneously in which each of the PRACH and the second channel are transmitted at a transmission power determined based on the priority (1506).

Figure 16:
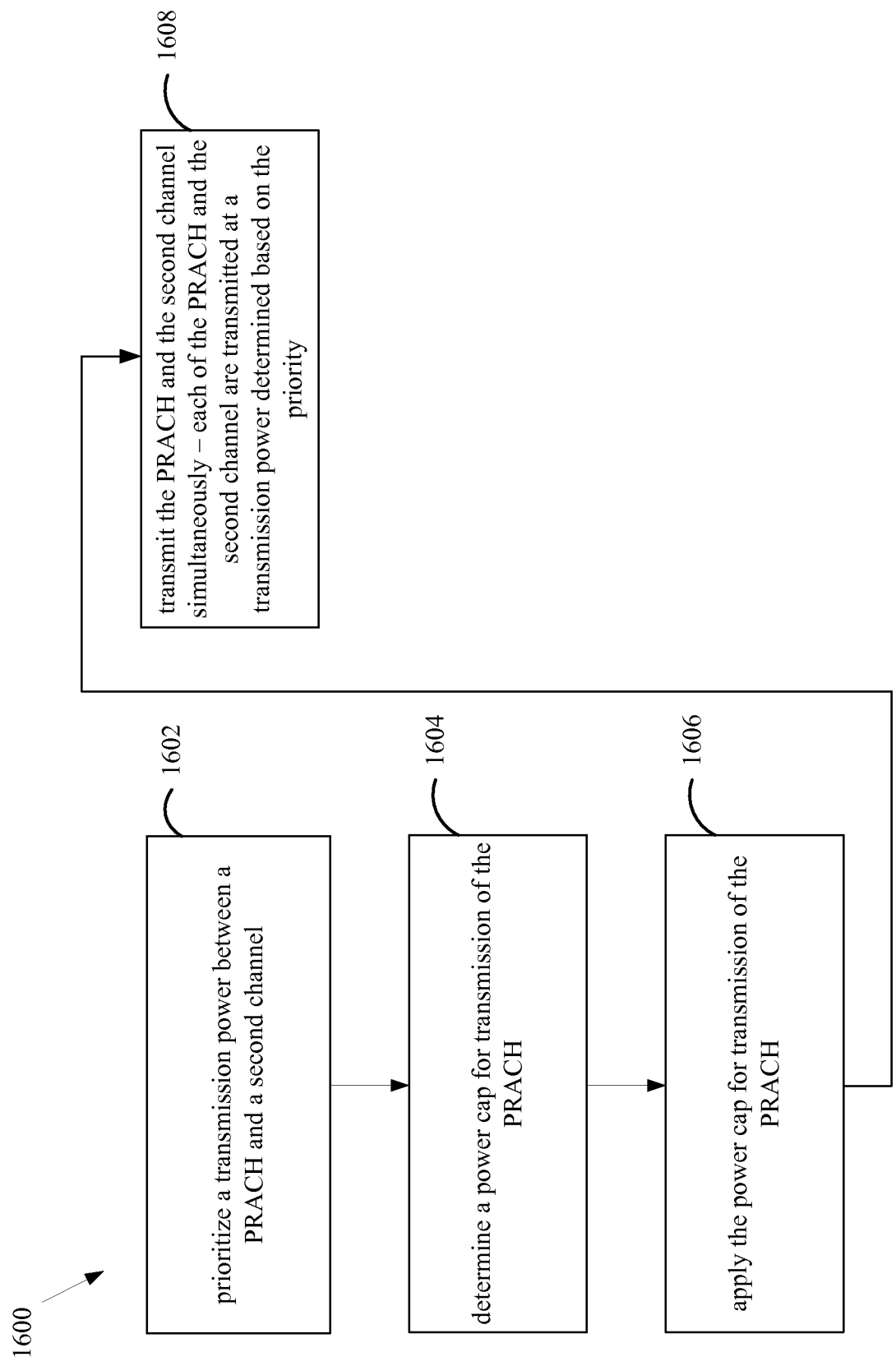
FIG. 16 is yet another flow chart in accordance with the second method of wireless communication.

FIG. 16 is yet another flow chart 1600 in accordance with the second method of wireless communication. According to the method, a UE prioritizes a transmission power between a PRACH and a second channel (1602). The UE determines a power cap for transmission of the PRACH (1604). The UE applies the power cap for transmission of the PRACH (1606). The UE transmits the PRACH and the second channel simultaneously (1608). Each of the PRACH and the second channel is transmitted at a transmission power determined based on the priority (1608).

In one configuration, the UE applies a power cap for transmission of the PRACH in each subframe in which the PRACH is transmitted. In one configuration, the UE may determine a power cap for each of a plurality of subframes in which the PRACH is transmitted. Furthermore, in such a configuration, the applied power cap is a lowest of the determined power caps. In one configuration, the UE may determine a power cap for transmission of the PRACH. In such a configuration, the applied power cap for transmission of the PRACH is a lowest power cap of the determined power cap and a previously applied power cap.

When the channel combination is as shown in channel combination 10 of FIG. 11 and the PRACH priority is less than the priority of the second channel, the UE may prioritize the transmission power between the PRACH and the second channel by assigning the PRACH a lower priority than the second channel only when a single-frame PRACH format is used for transmission of the PRACH. In one configuration, when the channel combination is as shown in channel combination 10 of FIG. 11 and the PRACH priority is less than the priority of the second channel, the UE applies a power cap for transmission of the PRACH in each subframe in which the PRACH is transmitted. In one configuration, the UE determines a power cap for each of a plurality of subframes in which the PRACH is transmitted. In such a configuration, the applied power cap is a lowest of the determined power caps. In another configuration, the UE determines a power cap for transmission of the PRACH. In such a configuration, the applied power cap for transmission of the PRACH is a lowest power cap of the determined power cap and a previously applied power cap.

Figure 17:
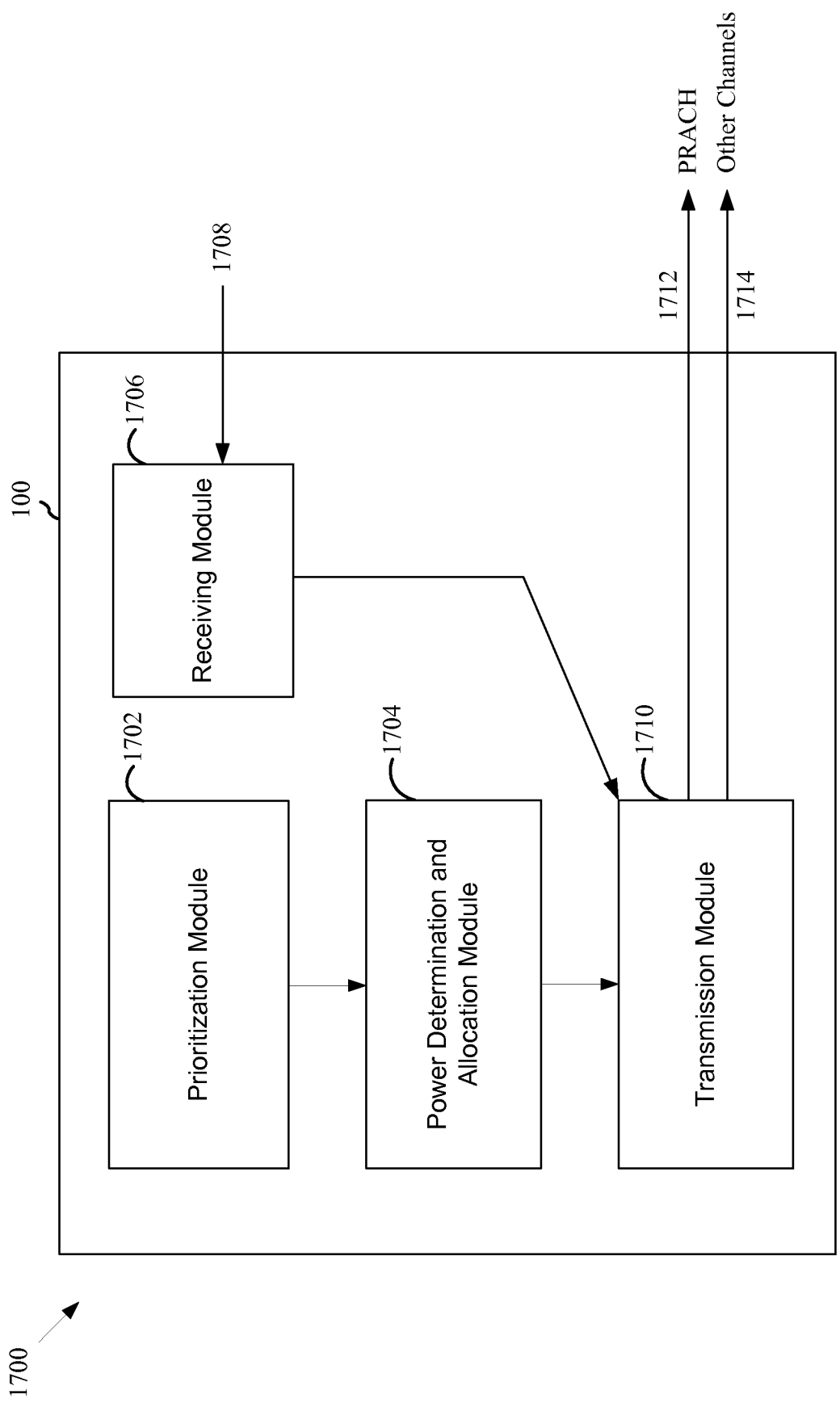
FIG. 17 is a block diagram illustrating the functionality of an exemplary apparatus.

FIG. 17 is a conceptual block diagram 1700 illustrating the functionality of an exemplary apparatus. The apparatus 100 includes a prioritization module 1702 that is configured to prioritize a transmission power between an access channel and a second channel. The priority information is passed to a power determination and allocation module 1704 that is configured to allocate a requisite transmission power to the channel with a higher priority and a remaining power to the channel with a lower priority. The apparatus 100 may further include a receiving module 1706 that is configured to receive information 1708 regarding first resources to use for transmitting an access channel with an ACK and second resources for transmitting the access channel with a NACK. The information from the power determination and allocation module 1704 and/or the information from the receiving module 1706 are passed to the transmission module 1710. The transmission module 1710 is configured to transmit the access channel 1712 and the second channel 1714 simultaneously. Each of the access channel 1712 and the second channel 1714 are transmitted at a transmission power determined based on the priority. The transmission module 1710 is also configured to transmit the access channel on one of the first resources or the second resources in order to indicate an ACK or a NACK, respectively.

The transmission module 1706 and/or the power determination and allocation module 1704 are configured to reduce the transmission power for transmitting the PRACH during one OFDM symbol in which the second channel is transmitted. The power determination and allocation module 1704 is also configured to determine a power cap for transmission of the PRACH when the PRACH is transmitted in a multi-subframe format. The transmission module 1706 is configured to apply the determined power cap. The apparatus 100 may include additional modules that perform each of the steps in the aforementioned flow charts. As such, each step in the aforementioned flow charts may be performed by a module, and the apparatus 100 may include one or more of those modules.

In one configuration, the apparatus 100 for wireless communication includes means for prioritizing a transmission power between an access channel and a second channel. The apparatus 100 further includes means for transmitting the access channel and the second channel simultaneously. Each of the access channel and the second channel is transmitted at a transmission power determined based on the priority. The apparatus 100 may further include means for allocating a requisite transmission power to the channel with a higher priority and means for allocating a remaining transmission power to the channel with a lower priority. The apparatus 100 may further include means for reducing the transmission power for transmitting the PRACH during one OFDM symbol in which the second channel is transmitted. The apparatus 100 may further include means for applying a power cap for transmission of the PRACH in each subframe in which the PRACH is transmitted. The apparatus 100 may further include means for determining a power cap for each of a plurality of subframes in which the PRACH is transmitted. In such a configuration, the applied power cap is a lowest of the determined power caps. The apparatus 100 may further include means for determining a power cap for transmission of the PRACH. In such a configuration, the applied power cap for transmission of the PRACH is a lowest power cap of the determined power cap and a previously applied power cap. The apparatus 100 may further include means for prioritizing the transmission power between the PRACH and the second channel assigns the PRACH a lower priority than the second channel only when a single-frame PRACH format is used for transmission of the PRACH. The aforementioned means may be one or more of the aforementioned modules of the apparatus 100 and/or the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

In one configuration, the apparatus 100 for wireless communication includes means for receiving information regarding first resources to use for transmitting an access channel with an ACK and second resources for transmitting the access channel with a NACK. The apparatus 100 further includes means for transmitting the access channel on one of the first resources or the second resources. The aforementioned means may be one or more of the aforementioned modules of the apparatus 100 and/or the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are intended to be encompassed by the claims.

What is claimed is:

1. A method of wireless communication, comprising:
   determining, for one subframe, a transmission power priority for a physical random access channel (PRACH) relative to a second channel, wherein the PRACH is used to perform an initial system access, wherein determining, for the subframe, the transmission power priority of the PRACH is based at least in part on determining whether the PRACH is of a format for which the PRACH is capable of spanning multiple consecutive subframes; and
   transmitting, in the subframe, the PRACH and the second channel simultaneously, each of the PRACH and the second channel being transmitted at a transmission power determined based on the transmission power priority determined for the subframe.

2. The method of claim 1, further including:
   allocating a requisite transmission power to a channel with a higher priority; and
   allocating a remaining transmission power to a channel with a lower priority.

3. The method of claim 1, wherein the PRACH and the second channel are transmitted on at least one component carrier of a plurality of component carriers.

4. The method of claim 3, wherein the plurality of component carriers includes a primary component carrier and at least one secondary component carrier; and
   wherein the determining the transmission power priority includes assigning the PRACH a first priority and the second channel a second priority when the PRACH carries timing information on the primary component carrier and the second channel is a physical uplink shared channel (PUSCH) transmitted on a secondary component carrier of the at least one secondary component carrier.

5. The method of claim 4, wherein the first priority is higher than the second priority.

6. The method of claim 3, wherein the plurality of component carriers includes a primary component carrier and at least one secondary component carrier; and
   wherein the determining the transmission power priority includes assigning the PRACH a first priority and the second channel a second priority when the PRACH indicates an uplink scheduling request on the primary component carrier and the second channel carries sounding reference signals (SRS) on the primary component carrier or a secondary component carrier of the at least one secondary component carrier.

7. The method of claim 6, wherein the first priority is higher than the second priority.

8. The method of claim 6, further including reducing the transmission power for transmitting the PRACH during one orthogonal frequency division multiplexing (OFDM) symbol in which the second channel is transmitted.

9. The method of claim 3, wherein the plurality of component carriers includes a primary component carrier and at least one secondary component carrier; and
   wherein the determining the transmission power priority includes assigning the PRACH a first priority and the second channel a second priority when the PRACH indicates an uplink scheduling request on the primary component carrier and the second channel is a physical uplink control channel (PUCCH) transmitted on the primary component carrier.

10. The method of claim 9, wherein the first priority is higher than the second priority.

11. The method of claim 3, wherein the plurality of component carriers includes a primary component carrier and at least one secondary component carrier; and
    wherein the determining the transmission power priority includes assigning the PRACH a first priority and the second channel a second priority when the PRACH carries timing information on a secondary component carrier of the at least one secondary component carrier and the second channel is transmitted on the primary component carrier.

12. The method of claim 11, wherein the first priority is lower than the second priority.

13. The method of claim 12, further including applying a power cap for transmission of the PRACH in each subframe in which the PRACH is transmitted.

14. The method of claim 13, further including determining a power cap for each of a plurality of subframes in which the PRACH is transmitted, wherein the applied power cap is a lowest of the determined power caps.

15. The method of claim 13, further including determining a power cap for transmission of the PRACH, wherein the applied power cap for transmission of the PRACH is a lowest power cap of the determined power cap and a previously applied power cap.

16. The method of claim 3, wherein the plurality of component carriers includes a primary component carrier and at least one secondary component carrier; and
    wherein the determining the transmission power priority includes assigning the PRACH a first priority and the second channel a second priority when the PRACH indicates an uplink scheduling request on the primary component carrier and the second channel is a physical uplink control channel (PUCCH) transmitted on the primary component carrier.

17. The method of claim 16, wherein the first priority is lower than the second priority.

18. The method of claim 1, wherein the determining the transmission power priority includes assigning the PRACH a lower priority than the second channel when the PRACH is not of the format for which the PRACH is capable of spanning multiple subframes.

19. The method of claim 17, further including applying a power cap for transmission of the PRACH in each subframe in which the PRACH is transmitted.

20. The method of claim 19, further including determining a power cap for each of a plurality of subframes in which the PRACH is transmitted, wherein the applied power cap is a lowest of the determined power caps.

21. The method of claim 19, further including determining a power cap for transmission of the PRACH, wherein the applied power cap for transmission of the PRACH is a lowest power cap of the determined power cap and a previously applied power cap.

22. An apparatus for wireless communication, comprising:
means for determining, for one subframe, a transmission power priority for a physical random access channel (PRACH) relative to a second channel, wherein the PRACH is used to perform an initial system access, wherein the means for determining determines, for the subframe, the transmission power priority of the PRACH based at least in part on determining whether the PRACH is of a format for which the PRACH is capable of spanning multiple consecutive subframes; and
means for transmitting, in the subframe, the PRACH and the second channel simultaneously, each of the PRACH and the second channel being transmitted at a transmission power determined based on the transmission power priority determined for the subframe.

23. The apparatus of claim 22, further including:
means for allocating a requisite transmission power to a channel with a higher priority; and
means for allocating a remaining transmission power to a channel with a lower priority.

24. The apparatus of claim 22, wherein the PRACH and the second channel are transmitted on at least one component carrier of a plurality of component carriers.

25. The apparatus of claim 24, wherein the plurality of component carriers includes a primary component carrier and at least one secondary component carrier; and
wherein the means for determining the transmission power priority includes means for assigning the PRACH a first priority and the second channel a second priority when the PRACH carries timing information on the primary component carrier and the second channel is a physical uplink shared channel (PUSCH) transmitted on a secondary component carrier of the at least one secondary component carrier.

26. The apparatus of claim 25, wherein the first priority is higher than the second priority.

27. The apparatus of claim 24, wherein the plurality of component carriers includes a primary component carrier and at least one secondary component carrier; and
wherein the means for determining the transmission power priority includes means for assigning the PRACH a first priority and the second channel a second priority when the PRACH indicates an uplink scheduling request on the primary component carrier and the second channel carries sounding reference signals (SRS) on the primary component carrier or a secondary component carrier of the at least one secondary component carrier.

28. The apparatus of claim 27, wherein the first priority is higher than the second priority.

29. The apparatus of claim 27, further including means for reducing the transmission power for transmitting the PRACH during one orthogonal frequency division multiplexing (OFDM) symbol in which the second channel is transmitted.

30. The apparatus of claim 24, wherein the plurality of component carriers includes a primary component carrier and at least one secondary component carrier; and
wherein the means for determining the transmission power priority includes means for assigning the PRACH a first priority and the second channel a second priority when the PRACH indicates an uplink scheduling request on the primary component carrier and the second channel is a physical uplink control channel (PUCCH) transmitted on the primary component carrier.

31. The apparatus of claim 30, wherein the first priority is higher than the second priority.

32. The apparatus of claim 24, wherein the plurality of component carriers includes a primary component carrier and at least one secondary component carrier; and
wherein the means for determining the transmission power priority includes means for assigning the PRACH a first priority and the second channel a second priority when the PRACH carries timing information on a secondary component carrier of the at least one secondary component carrier and the second channel is transmitted on the primary component carrier.

33. The apparatus of claim 32, wherein the first priority is lower than the second priority.

34. The apparatus of claim 33, further including means for applying a power cap for transmission of the PRACH in each subframe in which the PRACH is transmitted.

35. The apparatus of claim 34, further including means for determining a power cap for each of a plurality of subframes in which the PRACH is transmitted, wherein the applied power cap is a lowest of the determined power caps.

36. The apparatus of claim 34, further including means for determining a power cap for transmission of the PRACH, wherein the applied power cap for transmission of the PRACH is a lowest power cap of the determined power cap and a previously applied power cap.

37. The apparatus of claim 24, wherein the plurality of component carriers includes a primary component carrier and at least one secondary component carrier; and
wherein the means for determining the transmission power priority includes means for assigning the PRACH a first priority and the second channel a second priority when the PRACH indicates an uplink scheduling request on the primary component carrier and the second channel is a physical uplink control channel (PUCCH) transmitted on the primary component carrier.

38. The apparatus of claim 37, wherein the first priority is less than the second priority.

39. The apparatus of claim 22, wherein the means for determining the transmission power priority includes means for assigning the PRACH a lower priority than the second channel when the PRACH is of the format for which the PRACH is capable of spanning multiple subframes.

40. The apparatus of claim 38, further including means for applying a power cap for transmission of the PRACH in each subframe in which the PRACH is transmitted.

41. The apparatus of claim 40, further including means for determining a power cap for each of a plurality of subframes in which the PRACH is transmitted, wherein the applied power cap is a lowest of the determined power caps.

42. The apparatus of claim 40, further including means for determining a power cap for transmission of the PRACH, wherein the applied power cap for transmission of the PRACH is a lowest power cap of the determined power cap and a previously applied power cap.

43. An apparatus for wireless communication, comprising:
a memory; and at least one processor in communication with the memory, the at least one processor configured to:

determine, for one subframe, a transmission power priority for a physical random access channel (PRACH) relative to a second channel based, wherein the PRACH is used to perform an initial system access, wherein the at least one processor is configured to determine, for the subframe, the transmission power priority of the PRACH based at least in part on determining whether the PRACH is of a format for which the PRACH is capable of spanning multiple consecutive subframes; and transmit, in the subframe, the PRACH and the second channel simultaneously, each of the PRACH and the second channel being transmitted at a transmission power determined based on the transmission power priority determined for the subframe.

44. The apparatus of claim 43, wherein the at least one processor is further configured to:

allocate a requisite transmission power to a channel with a higher priority; and allocate a remaining transmission power to a channel with a lower priority.

45. The apparatus of claim 43, wherein the PRACH and the second channel are transmitted on a plurality of component carriers;

wherein the plurality of component carriers includes a primary component carrier and at least one secondary component carrier; and wherein the at least one processor is configured to determine the transmission power priority by assigning the PRACH a first priority and the second channel a second priority when the PRACH carries timing information on the primary component carrier and the second channel is a physical uplink shared channel (PUSCH) transmitted on a secondary component carrier of the at least one secondary component carrier.

46. The apparatus of claim 43, wherein the PRACH and the second channel are transmitted on a plurality of component carriers;

wherein the plurality of component carriers includes a primary component carrier and at least one secondary component carrier; and wherein the at least one processor is configured to determine the transmission power priority by assigning the PRACH a first priority and the second channel a second priority when the PRACH indicates an uplink scheduling request on the primary component carrier and the second channel carries sounding reference signals (SRS) on the primary component carrier or a secondary component carrier of the at least one secondary component carrier.

47. The apparatus of claim 43, wherein the PRACH and the second channel are transmitted on a plurality of component carriers;

wherein the plurality of component carriers includes a primary component carrier and at least one secondary component carrier; and wherein the at least one processor is configured to determine the transmission power priority by assigning the PRACH a first priority and the second channel a second priority when the PRACH indicates an uplink scheduling request on the primary component carrier and the second channel is a physical uplink control channel (PUCCH) transmitted on the primary component carrier.

48. The apparatus of claim 43, wherein the PRACH and the second channel are transmitted on a plurality of component carriers;

wherein the plurality of component carriers includes a primary component carrier and at least one secondary component carrier; and wherein the at least one processor is configured to determine the transmission power priority by assigning the PRACH a first priority and the second channel a second priority when the PRACH carries timing information on a secondary component carrier of the at least one secondary component carrier and the second channel is transmitted on the primary component carrier.

49. The apparatus of claim 43, wherein the PRACH and the second channel are transmitted on a plurality of component carriers;

wherein the plurality of component carriers includes a primary component carrier and at least one secondary component carrier; and wherein the at least one processor is configured to determine the transmission power priority for the PRACH relative to the second channel by assigning the PRACH a first priority and the second channel a second priority when the PRACH indicates an uplink scheduling request on the primary component carrier and the second channel is a physical uplink control channel (PUCCH) transmitted on the primary component carrier.

50. A non-transitory computer-readable storage medium comprising computer-executable code for wireless communications, the code comprising:

code for determining, for one subframe, a transmission power priority for a physical random access channel (PRACH) relative to a second channel based, wherein the PRACH is used to perform an initial system access, wherein the code for determining determines, for the subframe, the transmission power priority of the PRACH based at least in part on determining whether the PRACH is of a format for which the PRACH is capable of spanning multiple consecutive subframes; and code for transmitting, in the subframe, the PRACH and the second channel simultaneously, each of the PRACH and the second channel being transmitted at a transmission power determined based on the transmission power priority determined for the subframe.

51. The non-transitory computer-readable storage medium of claim 50, wherein the code further includes:

code for allocating a requisite transmission power to the channel with a higher priority; and code for allocating a remaining transmission power to the channel with a lower priority.

52. The method of claim 1, wherein determining the transmission power priority comprises determining a higher transmission power priority for the PRACH than the second channel based at least in part on determining that the PRACH is of the format for which the PRACH is capable of spanning multiple consecutive subframes.

53. The method of claim 52, further comprising:

allocating a requisite transmission power to the PRACH in the multiple consecutive subframes; and maintaining the requisite transmission power for the PRACH over the multiple consecutive subframes.

* * * * *